March 29, 1949.

E. G. STAUDE 2,465,761

DOUBLE-ACTING PROPORTIONAL
PRESSURE POWER AMPLIFIER

Filed Dec. 8, 1943

INVENTOR
Edwin G. Staude
BY
Arthur Wright
ATTORNEY

March 29, 1949.  E. G. STAUDE  2,465,761
DOUBLE-ACTING PROPORTIONAL
PRESSURE POWER AMPLIFIER
Filed Dec. 8, 1943  4 Sheets-Sheet 4

INVENTOR
Edwin G. Staude
BY
Arthur Wright
ATTORNEY

Patented Mar. 29, 1949

2,465,761

UNITED STATES PATENT OFFICE 2,465,761

DOUBLE-ACTING PROPORTIONAL PRESSURE POWER AMPLIFIER

Edwin G. Staude, Minneapolis, Minn., assignor of one-half to Olive B. Staude, Minneapolis, Minn.

Application December 8, 1943, Serial No. 513,647

10 Claims. (Cl. 60—52)

My invention relates particularly to the control of any desired mechanism, by means of an improved type of pressure power amplifier, over my Patent No. 2,095,841, upon Power amplifier for motor car controls granted October 12, 1937, as for example in the operation of automotive equipment, such, for instance as power steering rudders or elevators or ailerons of airplanes.

The object of my invention is to provide an apparatus of the above character whereby the control of any desired mechanism to be moved can be accomplished substantially instantaneously. Another object is to provide an apparatus of the above character which is double acting so that the part to be moved can be moved in either direction with complete and accurate control thereof at all times. Another object is to provide a double acting rotary vane construction for actuating the same and from which any substantial lag, in the operation by the control mechanism, is obviated. Still another object is to provide means for operating the same by means of a single fluid pump circuit in which the continuously circulating fluid passes through two vanes that are to be moved, as desired, when the fluid pump is in operation, and which permits the manual control of the part to be moved even when the pump is out of action for any reason. A further object is to provide two proportional pressure valves, which valves act against the fluid flow when manually operated to cause a restricted passage and thereby build up a fluid pressure, and which pressure acting against the area of the valve, whichever is operated, is transmitted to the manual control for the purpose of building up a pressure "feel" on the manual control so the operator will have to push harder on the control as the required pressure is increased. A further object is to provide a valve structure whereby only one valve can be closed at a time. Further objects of my invention will appear from the detailed description of the same hereinafter.

While my invention is capable of embodiment in many different forms, for the purpose of illustration I have shown only one form thereof in the accompanying drawings, in which Fig. 1 is a side elevation of an apparatus made in accordance with my invention;

Figure 2:
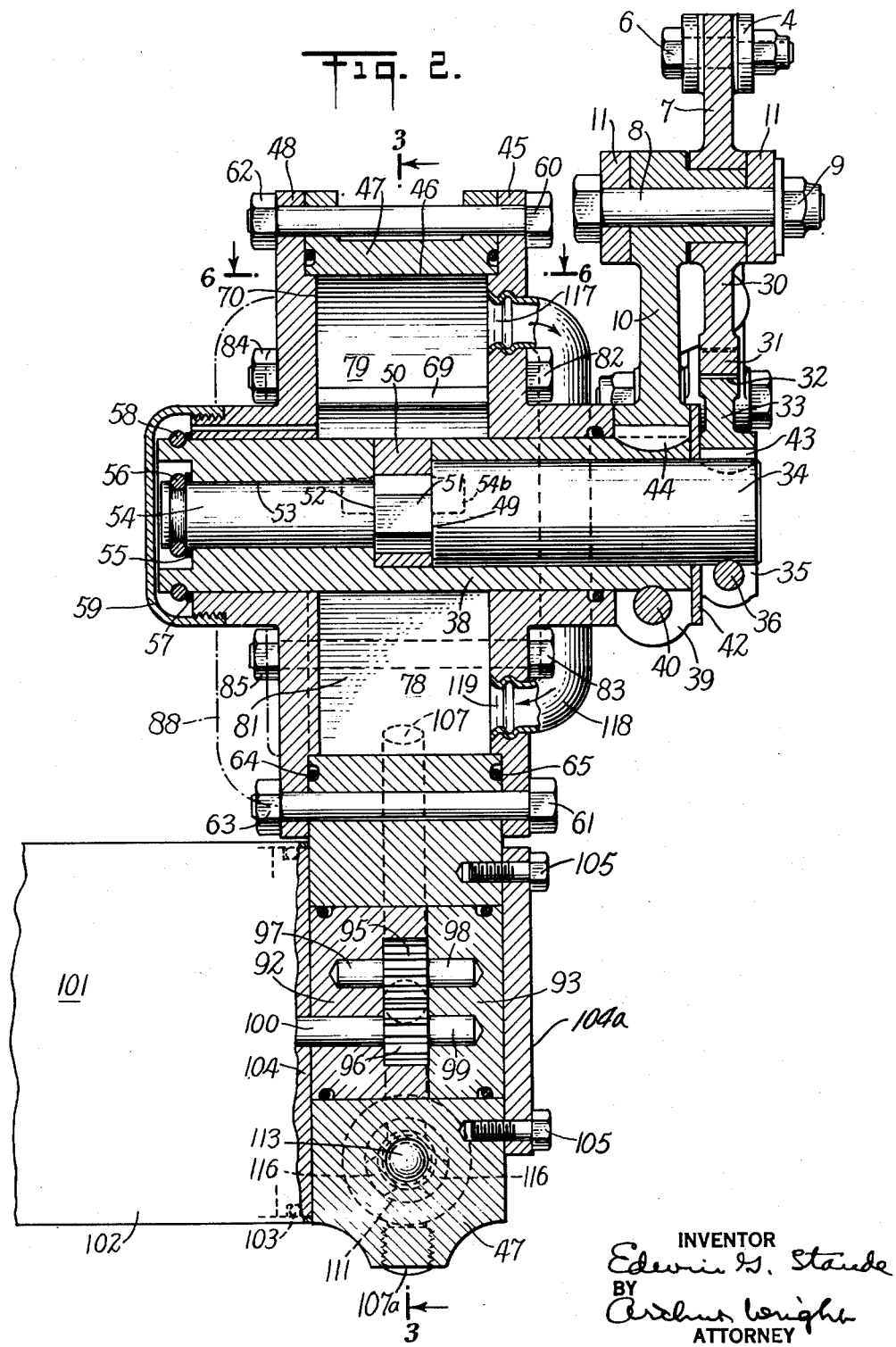
Fig. 2 is a vertical section of the same taken on line 2—2 of Fig. 1.

In the drawings, I have shown two cables 1 and 2 which are connected to any desired manual control element, not shown, in the cockpit of an airplane. These two cables 1 and 2 are connected to bifurcated socket members 3 and 4. respectively, which are pivoted by means of pins 5 and 6 to the upper end of a lever 7. The lever 7 is pivotally connected by a bolt 8, having a nut 9, to a main lever 10. On the bolt 8 there is also a link 11 having sockets 12 and 13 which are connected, respectively, to cables 14 and 15 which lead to any desired part to be moved, as for example the rudder of an airplane, the said cables 14 and 15 leading to opposite sides of said rudder so that they will, respectively, move the said rudder in opposite directions when operated manually from the cables 1 and 2. It will be understood, likewise, that the cables 1 and 2 are operated simultaneously, but in opposite directions, from a manually movable control element, not shown, contained in the airplane cockpit. Also, it will be noted that the cable 1 moves said part manually in the same direction as the said part is moved by the cable 14 by means of power. The same is true, also, of the cables 2 and 15. On the side of the lever 10 there is a centering device to normally keep the manual control in middle position when not being actuated and to restore the manually operated element to middle position, comprising a boss 16 on which there is mounted, by means of a pivot 17, a link 18 through which passes a rod 19, having a head 20, supported within an ear 21 on the lever 10 and the other end of which has a nut 22 supporting a spring 23, one end of which rests against the side of the link 18. On the upper end of the link 18 there is a roller 24 carried between arms 25 and 26 in which the roller is pivotally supported upon a pivot 27 having a rivet passing through the roller 24. This roller 24 operates within an angular recess 28 carried by a projection 29 on the side of the lever 7. The said lever 7, below the pivot 8, has an arm 30 provided with a tooth 31 which extends into a recess 32 on a lever 33 which is keyed to a central shaft 34 and to which it is fastened also by a split ring 35 having a bolt 36 passing through the same and provided with a nut 37. This central shaft 34 is located within a sleeve shaft 38 on which the lever 10 is keyed and fastened thereto by means of a split ring 39 and a bolt 40 having a nut 41 thereon. A washer 42 is located between the levers 33 and 10. As shown in Fig. 2, the lever 33 is fastened to its shaft 34 by a Woodruff key 43 and the lever 10 is fastened to its shaft 38 by a Woodruff key 44. The said two shafts 34 and 38 are supported within an end plate 45 so as to pass through a chamber 46 within a casing 47 and thence through a cover plate 48. On its left hand end, referring to Fig. 2, the shaft 34 has a reduced portion at 49 to receive an oscillating member 50 fitted over a hexagonal portion 51. A further reduction of the shaft 34 is at 52, resulting in the shaft 54 which has a bearing 53 in the sleeve shaft 38. The oscillating member 50 has two valve operating arms 54a and 54b. The said shaft 54 has a washer 55 and a split snap ring 56 to hold it in place within the shaft 38. Also, the shaft 38 has a washer 57 and a split snap ring 58 for holding the same in place. A screw cap 59 on the cover plate 48 covers the ends of the shafts 54 and 38 against access of dust. Upper and lower bolts 60 and 61, having nuts 62 and 63, as well as other similar bolts, hold the end plate 45 and the cover plate 48 on the casing 47, annular rubber sealing rings 64 and 65 being provided on opposite sides of the casing 47.

Figure 6:
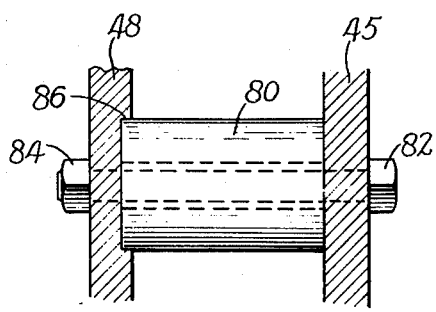
Fig. 6 is a horizontal section taken on line 6—6 of Fig. 2.

The said shaft 38 has formed thereon two vanes 66 and 67 having upwardly directed curved extensions 68 and 69 which oscillate in a circular cavity 70 forming a part of the chamber 46. The vane 66 has a passageway 71 provided with conical enlargements 72 adjacent to a circular valve seat 73 cooperating with a ball valve 74. Likewise, the vane 67 has a similar passageway 75 provided with a circular valve seat 76 and a ball valve 77. The circular cavity 70 is divided into two chambers 78 and 79 in which the vanes 66 and 67 oscillate, respectively, the said two chambers 78 and 79 being separated by an upper spacer 80 and a lower spacer 81, secured within the casing 47 by bolts 82 and 83, respectively, having nuts 84 and 85. It will be noted from Fig. 6, that one end of the spacer 80 is carried in a recess 86 within the cover plate 48, to take the load applied to the spacer. The spacer 81 is similarly supported within the cover plate 48. The chambers 78 and 79, and connected passageways, are filled with hydraulic liquid of any desired character. The chamber 78 has an upper port 87 connected by a curved copper tube 88 extending on the outside of the cover plate 48, the lower end of said copper tube 88 being connected to a port 89 leading to a passageway 90 in the casing 47 which communicates with an inlet port 91 of a gear pump housing 92, 93 which fits within the lower end of the casing 47. The two parts of the gear pump housing 92, 93 are fastened together by a plurality of screws 94 so as to hold in place between the same, pump gears 95 and 96. The pump gear 95 has stud shafts 97 and 98 within the two parts of the pump housing 92, 93 and the pump gear 96 has a stud shaft 99 in the pump housing 93 as well as a motor shaft 100 passing through the pump housing member 92 and thence into an electric motor 101 in a casing 102 having an annular rubber seal 103 and a motor cover plate 104, which is fastened in any desired manner to the casing 47, the latter having an end plate 104a secured thereto as, for example, by screws 105. It will be noted that the meshing pump gears 95 and 96 have a discharge port 106 connected to a vertical discharge passageway 107. In case, for any reason, the pump gears 95 and 96 are not being operated, as for example when there is any break down of the pump or the motor 101 for driving the same, provision is made to connect the passageways 90 and 107 for the passage of the liquid between the same and around the gear pump so as to enable the control mechanism to be operated manually. For this purpose, the passageway 90 extends downwardly below the gear pump and is closed at the end by a plug 108. Above the plug 108 there is a horizontal passageway 109 which leads to a passageway 110 in a hardened steel ball-seat ring 111, screw-threaded in the side of the casing 47, which is provided with a valve seat 112 for a ball valve 113 normally pressed against its seat by a helical spring 114, the other end of which rests against a screw-threaded plug 115 in the ring 111. The ring 111, furthermore, has a plurality of radially directed passageways 116 communicating with the vertical passageway 107 which is closed at its lower end by a plug 107a. The said vertical passageway 107 delivers the pressure liquid from the pump gears 95 and 96 upwardly into the chamber 79, and when the control apparatus is not being operated and the liquid is accordingly passing by the ball valves 77 and 74, the liquid in the chamber 79 will pass out through a port 117 and thence through a copper tube 118 on the outside of the end plate 45 and thence downwardly to a port 119 in the chamber 78, whence the liquid passes upwardly through the passageway 71 past the ball valve 74 out through the port 87, downwardly through the pipe 88 and into the passageway 90 to the inlet side of the pump gears 95 and 96.

Figure 1:
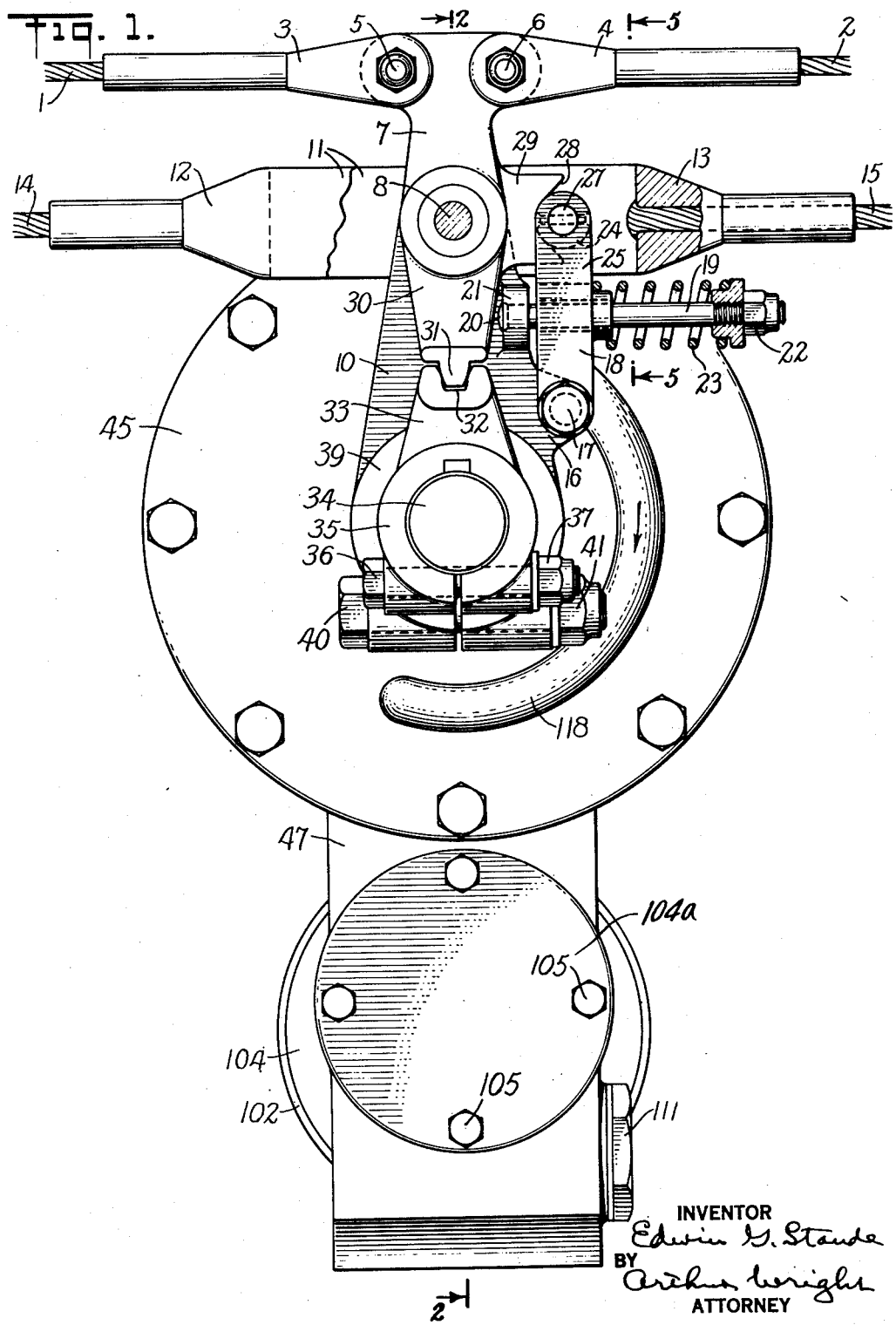
Figure 3:
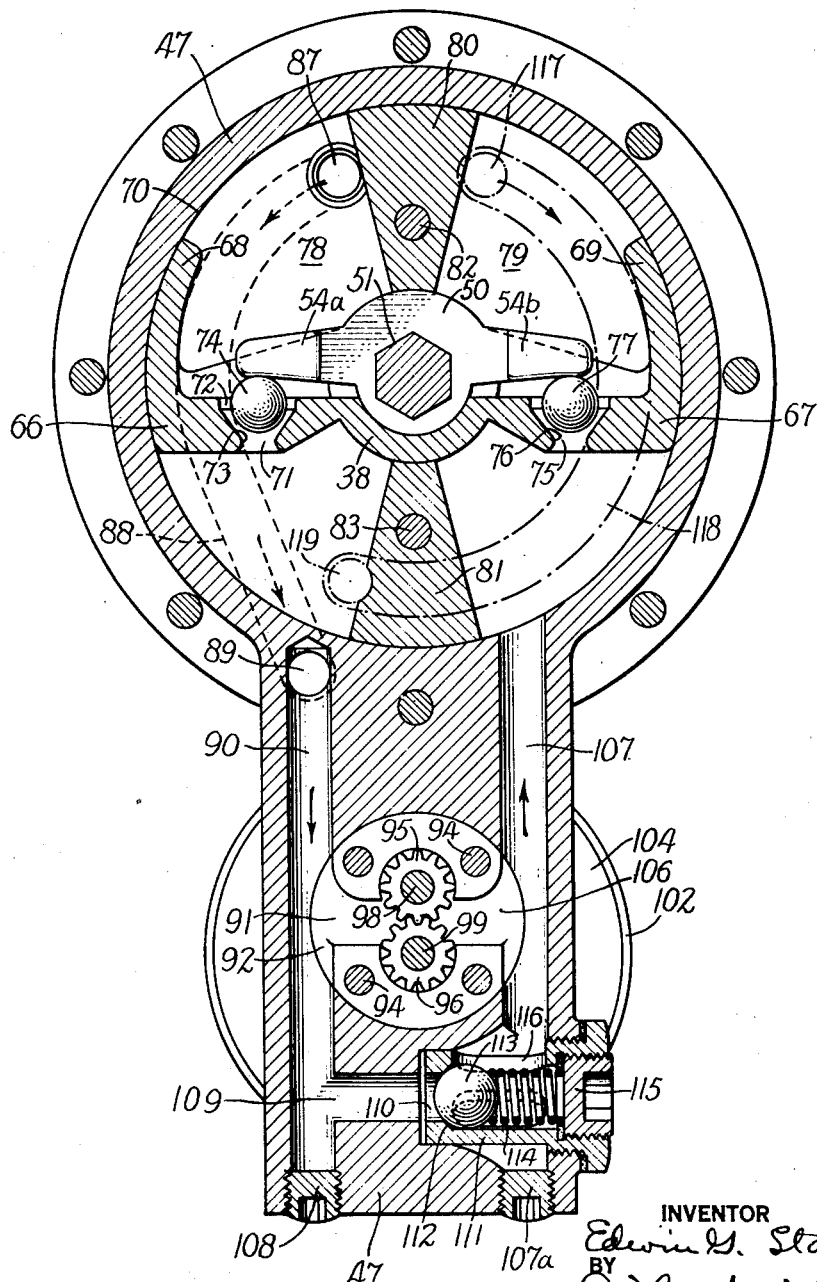
Fig. 3 is a vertical section of the same taken on line 3—3 of Fig. 2.
Figure 4:
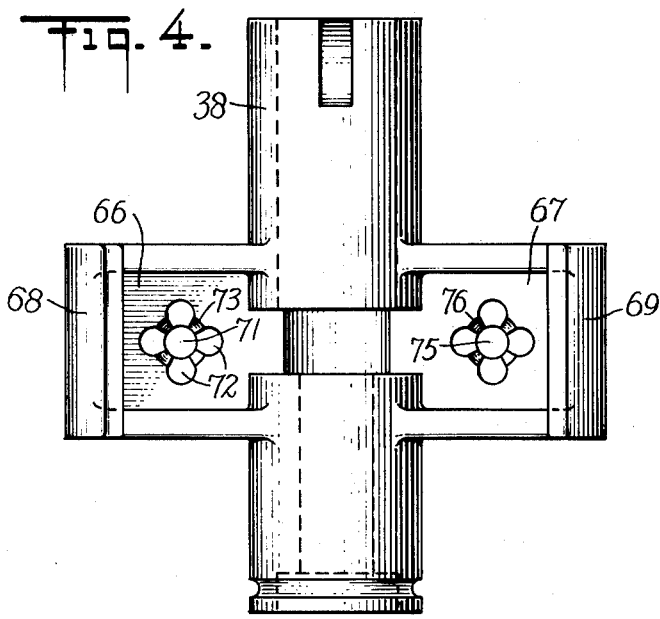
Fig. 4 is a plan view of the double acting vanes.
Figure 5:
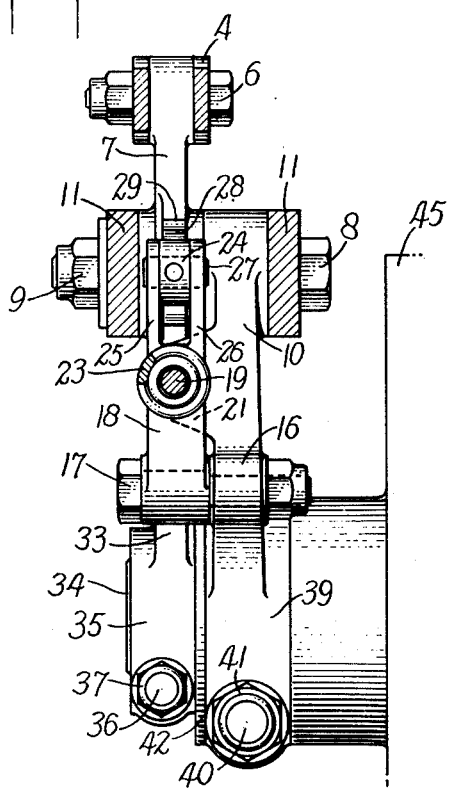
Fig. 5 is an elevation partly in section thereof, taken on line 5—5 of Fig. 1.

In the operation of the apparatus made in accordance with my invention, when, for example, the cables 1 and 2 are moved to the left by the operator in the airplane cockpit, this not only tends to move the pivot 8 and the connected cables 14 and 15 to the left, exerting a manual force to move the rudder in a given direction, but this results, also, in the movement of the lever arm 30 to the right, which, accordingly, moves the lever 33 to the right, thus moving the valve arm 54b downwardly, tending to seat the ball valve 77 while simultaneously tending to move the vane 67 upwardly towards the closing position of said valve. This obstructs the circulation of the liquid from the gear pump 95, 96, resulting in the exertion of an upwardly directed force on the vane 67, which in turn, through the lever 10, applies power for the movement of the cables 14 and 15 towards the left. As the member 50 turns slightly to the right, in Fig. 3, when the cables 1 and 2 are manually moved to the left, it moves the arm 54b against the ball 77, which tends to obstruct the flow of the fluid through the passageway 75 and thereby builds up a pressure depending on the degree of pressure of the arm 54b against the ball 77. This pressure acting through the area of the passageway 75 acts against the ball 77 and against the arm 54b which reacts against the member 50, which in turn reacts counter-clockwise on the central shaft 34 (Fig. 3), then against the tooth 31 on the arm 30 of the lever 7, which pressure opposes the manual effort of a pull on the cable 1 to the left, in Fig. 1. As the pull on the cable 1 is increased to overcome the reacting pressure, the reacting pressure also increases in direct proportion to the ratio provided in the pressure area against the ball and the lever relationship of the arm 30 and the lever 33. This construction provides a positive reacting proportional pressure against the manual control, which is instantaneous in action because the passages and the vane spaces are full of fluid under slight circulating pressure at all times which, since the fluid, being a liquid, cannot be compressed, acts instantly against the vanes and moves the same, depending on the degree of movement of the cables 1 and 2 and the effort applied, which must be proportionately greater as higher pressures are required. The further fact that the pressure controlling valves 74 and 77, are acted upon by the fluid pressure to be opened by the pressure instantly and immediately, thus reestablishing the neutral "cruising" circuit, is of great importance, especially where quick operation may prevent a serious accident. When the cables 1 and 2 are moved towards the right a similar manual force is applied on the cables 14 and 15 towards the right, tending to seat the ball valve 74 by the arm 54a with the upward movement of the vane 66, which results in the pressure liquid from the pump 95, 96 passing upwardly through the passage 107 past the ball valve 77, through the port 117, downwardly through the curved pipe 118 and through the port 119 to the underside of the vane 66, thus exerting power moving the cables 14 and 15 toward the right. In case, for any reason, the pump gears 95 and 96 are not operating, the control apparatus can be operated manually without power, inasmuch as a movement of the cable 1 towards the left moves the cable 14 manually towards the left, and, vice versa, a movement of the cable 2 towards the right moves the cable 15 manually toward the right. This movement of the cable 1 towards the left will close the ball valve 77, and, vice versa, the movement of the cable 2 to the right closes the ball valve 74, but in either of these conditions of operation the hydraulic liquid can circulate around the stationary pump gears 95, 96 through the passageway 109. In other words, when the arm 54b is moved downwardly the vane 67 will be moved upwardly, closing the ball valve 77, whereupon the liquid in the chamber 79 will pass through the port 117, curved pipe 118, port 119, past the ball valve 74, then through the port 87, the pipe 88, the passage 90, passageway 109, past the ball valve 113, into the passage 107 and then to the point beneath the vane 67. When, on the other hand, the arm 54a is moved downwardly, this will also move the vane 66 upwardly, closing the ball valve 74, so that the liquid in the chamber 78 above the vane 66 will pass out through the port 87, pipe 88, passage 90, passageway 109, past the ball valve 113, into the passage 107, to the chamber 79, through the ball valve 77 and thence by the port 117, pipe 118, port 119 and chamber 78 to the point beneath the vane 66.

While I have described my invention above in detail I wish it to be understood that many changes may be made therein without departing from the spirit of the same.

I claim:

1. In combination, a control means, a part to be moved adapted to be controlled thereby, a pump adapted to circulate a pressure liquid, and a plurality of vanes connected to said part, a casing in which the vanes are moved, said vanes having valves, respectively, controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means.

2. In combination, a control means, a part to be moved adapted to be controlled thereby, a pump adapted to circulate a pressure liquid, and a plurality of oscillating rotary vanes connected to said part, a casing in which the vanes are moved, said vanes having valves, respectively, controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means.

3. In combination, a control means, a part to be moved adapted to be controlled thereby, a pump adapted to circulate a pressure liquid, and a plurality of vanes connected to said part, a casing in which the vanes are moved, said vanes having valves, respectively, controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means, said connection comprising valve actuating arms.

4. In combination, a control means, a part to be moved adapted to be controlled thereby, a pump adapted to circulate a pressure liquid, and a plurality of vanes connected to said part, a casing in which the vanes are moved, said vanes having valves, respectively, controlling the circulation of said pressure liquid so as to move the vanes in opposite directions, respectively, said valves, having a lever connection to the control means, said vanes having ports being adapted to obstruct the circulation of said liquid by the closing movement of each of said valves so as to exert the power of the pressure liquid alternately on said vanes according to the position of the control means, said lever connection comprising valve actuating arms having another lever connection to the part to be moved, said two lever connections being mounted so as to be rotatable on concentric shafts.

5. In combustion, a control means, a part to be moved adapted to be controlled thereby, a pump adapted to circulate a pressure liquid, and a plurality of oscillating rotary vanes connected to said part, a casing in which the vanes are moved, said vanes having valves, respectively controlling the circulation of said pressure liquid so as to move the vanes in opposite directions, respectively, said valves, having a lever connection to the control means, said vanes having ports being adapted to obstruct the circulation of said liquid by the closing movement of each of said valves so as to exert the power of the pressure liquid alternately on said vanes according to the position of the control means, said lever connection comprising valve actuating arms having another lever connection to the part to be moved, said two lever connections being mounted so as to be rotatable on concentric shafts.

6. In combination, a control means movable to and from a middle position, a part to be moved adapted to be controlled thereby, a pump adapted to circulate a pressure liquid, a plurality of oscillating rotary vanes connected to said part, a casing in which the vanes are moved, said vanes having valves, respectively controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means, and a centering means restoring the control for said valves to its initial middle position.

7. In combination, a control means movable to and from a middle position, a part to be moved adapted to be controlled thereby, a pump adapted to circulate a pressure liquid, a plurality of oscillating rotary vanes connected to said part, a casing in which the vanes are moved, said vanes having valves, respectively, controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means, and a centering means, comprising a spring pressed detent, restoring the control for said valves to its initial middle position.

8. In combination, a manually operable control means, a manually movable work-performing part to be moved adapted to be controlled thereby, a pump adapted to circulate a pressure liquid, a plurality of vanes connected to said part, a casing in which the vanes are moved, said vanes having valves, respectively, controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means, and a valved by-pass permitting the manual operation of said part by conveying the flow of the liquid around the pump when the latter is not operating.

9. In combination, a manually operable control means, a manually movable work-performing part to be moved adapted to be controlled thereby, a pump adapted to circulate a pressure liquid, a plurality of vanes connected to said part, a casing in which the vanes are moved, said vanes having valves, respectively, controlling the circulation of said pressure liquid so as to move the vanes in opposite directions, respectively, said valves, having a connection to the control means, said vanes having ports being adapted to obstruct the circulation of said liquid by the closing movement of each of said valves so as to exert the power of the pressure liquid alternately on said vanes according to the position of the control means, and a single acting valved by-pass permitting the manual operation of said part conveying the flow of the liquid around the pump when the latter is not operating, adapted to by-pass the liquid around the pump when the vanes are moved in either direction.

10. A double acting fluid power amplifier having a pump, a fluid circuit including a chamber, fixed partitions within said chamber to divide said chamber into compartments, a vane within each of said compartments, said vanes having a common hub connecting them together and each being provided with a sleeve in the side wall of said chamber, said sleeve being connected to the work to be performed, said circuit also including passage leading from the output side of the pump into one of the said compartments to one side of its vane, a passage from the other side of the last mentioned vane to one side of the other vane, and a passage from the other side of said other vane returning to the intake side of said pump, valves located in said vanes for restricting the flow of the fluid through said vanes, alternatively, to produce a pressure against either of said vanes when its valve is moved towards closed position, and manually operable valve controlling means connected to said valves to move said valves alternatively towards closed position, including a reverse motion mechanism operable in either direction from an initial inactive position and a spring actuated centering member for urging said reverse motion mechanism into the initial inactive position.

EDWIN G. STAUDE.

REFERENCES CITED

The following references are of record in the file of this patent:

UNITED STATES PATENTS

| Number | Name | Date |
|---|---|---|
| 1,454,396 | MacDonald | May 8, 1923 |
| 1,468,236 | Kasley | Sept. 18, 1923 |
| 2,078,749 | Wood | Apr. 27, 1937 |
| 2,095,841 | Staude | Oct. 12, 1937 |
| 2,250,393 | Rado | July 22, 1941 |

FOREIGN PATENTS

| Number | Country | Date |
|---|---|---|
| 295,290 | Great Britain | Oct. 31, 1929 |
| 376,983 | Great Britain | July 21, 1932 |